United States Patent
Rantala et al.

(10) Patent No.: US 10,404,899 B2
(45) Date of Patent: Sep. 3, 2019

(54) MODULAR CAMERA BLOCKS FOR VIRTUAL REALITY CAPTURE

(71) Applicant: Nokia Technologies Oy, Espoo (FI)

(72) Inventors: Enrico Henrik Rantala, Berkeley, CA (US); Esa Tuomaala, El Cerrito, CA (US); Mika Kasslin, Espoo (FI); Janne Marin, Espoo (FI); Olli Alanen, Vantaa (FI); Muninder Veldandi, San Jose, CA (US); Mark Wagner, Oakland, CA (US); Fred Simon, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 75 days.

(21) Appl. No.: 15/626,517

(22) Filed: Jun. 19, 2017

(65) Prior Publication Data

US 2018/0007245 A1    Jan. 4, 2018

(30) Foreign Application Priority Data

Jun. 30, 2016 (EP) .................................. 16177030

(51) Int. Cl.
*H04N 7/00* (2011.01)
*H04N 5/225* (2006.01)
(Continued)

(52) U.S. Cl.
CPC .......... *H04N 5/2253* (2013.01); *G03B 37/04* (2013.01); *H04N 5/2251* (2013.01); *H04N 5/2252* (2013.01); *H04N 5/2258* (2013.01); *H04N 5/23238* (2013.01); *H04N 5/247* (2013.01); *H04N 7/10* (2013.01); *H04N 13/243* (2018.05); *G06T 19/006* (2013.01); *H04N 5/9201* (2013.01); *H04N 2213/001* (2013.01)

(58) Field of Classification Search
CPC ........................... H04N 13/239; H04N 13/243
See application file for complete search history.

(56) References Cited

U.S. PATENT DOCUMENTS

2003/0133008 A1    7/2003 Stephenson
2007/0147827 A1*   6/2007 Sheynman ............. G03B 29/00
                                            396/325
(Continued)

OTHER PUBLICATIONS

"Jump", Google VR, Retrieved on May 30, 2017, Webpage available at : https://vr.google.com/jump/.

(Continued)

*Primary Examiner* — Tat C Chio
*Assistant Examiner* — Fabio S Lima
(74) *Attorney, Agent, or Firm* — Mendelsohn Dunleavy, P.C.; Yuri Gruzdkov

(57) ABSTRACT

An apparatus comprises: a camera module for obtaining a first image, the camera module having at least one port, each of the at least one ports being associated with an attachment position for receiving a second camera module for obtaining a second image; a processor for detecting a position of a second camera module and providing, to an image processing controller, information relating to at least one of the position of the second camera module and the first image obtained by the camera module; and a memory for storing the information relating to at least one of the position of the second camera module and the first image obtained by the camera module.

20 Claims, 13 Drawing Sheets

(51) Int. Cl.
*H04N 13/243* (2018.01)
*H04N 5/232* (2006.01)
*H04N 5/247* (2006.01)
*H04N 7/10* (2006.01)
*G03B 37/04* (2006.01)
*G06T 19/00* (2011.01)
*H04N 5/92* (2006.01)

(56) References Cited

U.S. PATENT DOCUMENTS

| | | | |
|---|---|---|---|
| 2009/0040293 A1* | 2/2009 | Foo | G03B 37/04 348/36 |
| 2010/0177201 A1* | 7/2010 | Filipovich | G02B 23/125 348/217.1 |
| 2014/0028851 A1 | 1/2014 | Shan et al. | |
| 2016/0088280 A1 | 3/2016 | Sadi et al. | |
| 2016/0165135 A1* | 6/2016 | Lee | H04N 5/23238 348/38 |
| 2016/0191815 A1* | 6/2016 | Annau | H04N 5/247 348/38 |
| 2017/0295324 A1* | 10/2017 | Cabral | H04N 5/23206 |

OTHER PUBLICATIONS

"Odyssey", GoPro, Retrieved on May 30, 2017, Webpage available at : https://shop.gopro.com/International/odyssey.

"Introducing Facebook Surround 360: An Open, High-Quality 3D-360 Video Capture System", Facebook, Retrieved on May 30, 2017, Webpage available at : https://code.facebook.com/posts/1755691291326688/introducing-facebook-surround-360-an-open-high-quality-3d-360-video-capture-system/.

Extended European Search Report received for corresponding European Patent Application No. 16177030.0, dated Sep. 12, 2016, 7 pages.

Office action received for corresponding European Patent Application No. 16177030.0, dated Sep. 20, 2018, 6 pages.

* cited by examiner

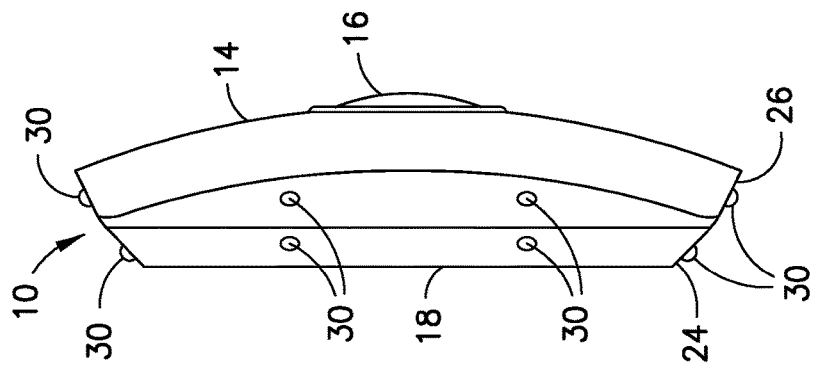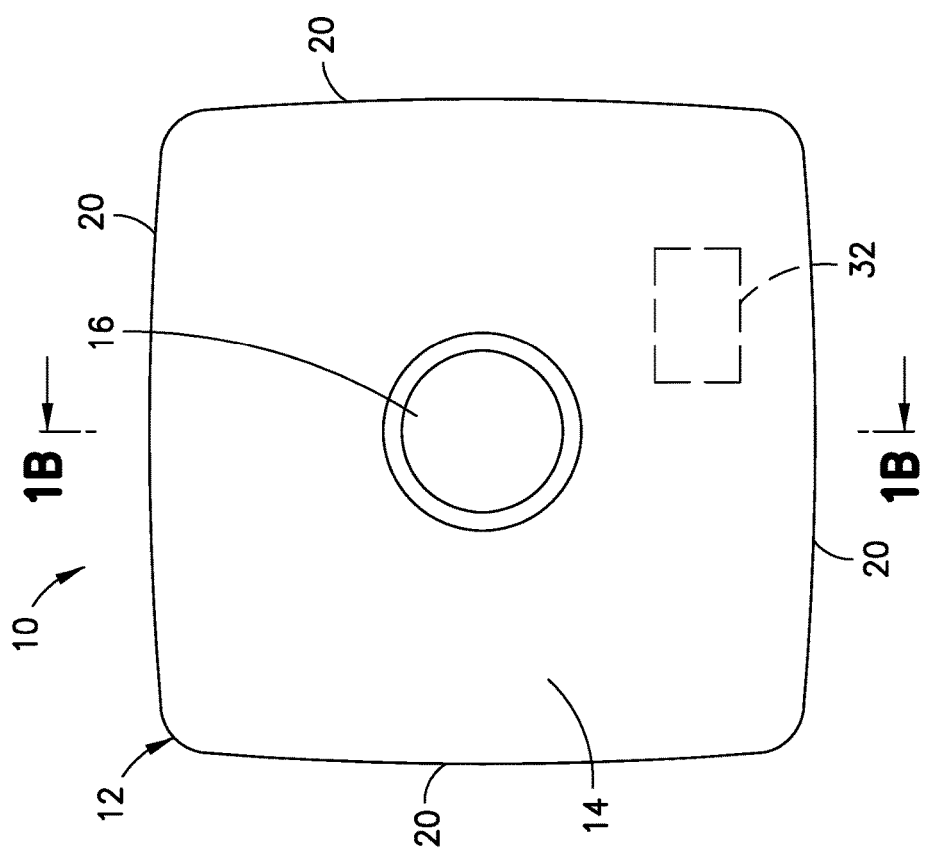

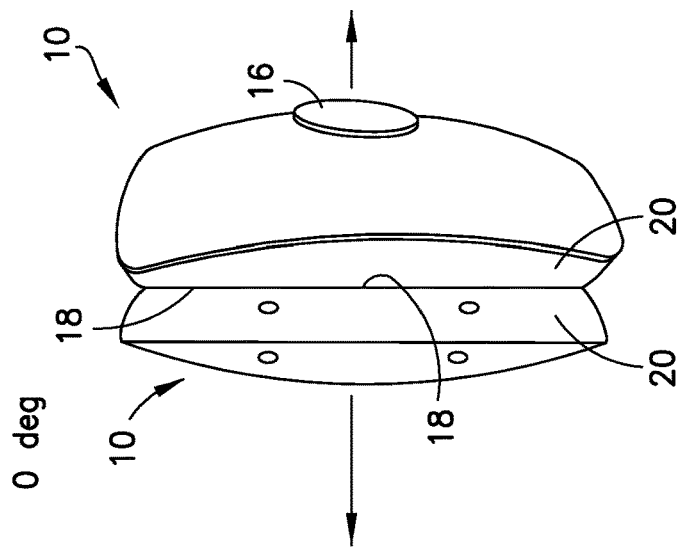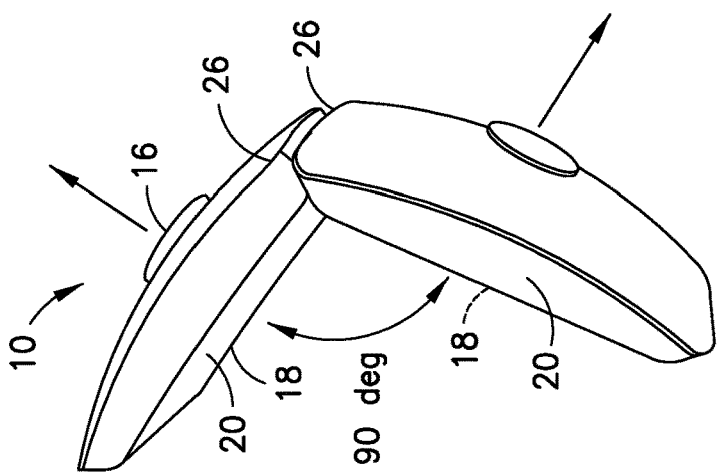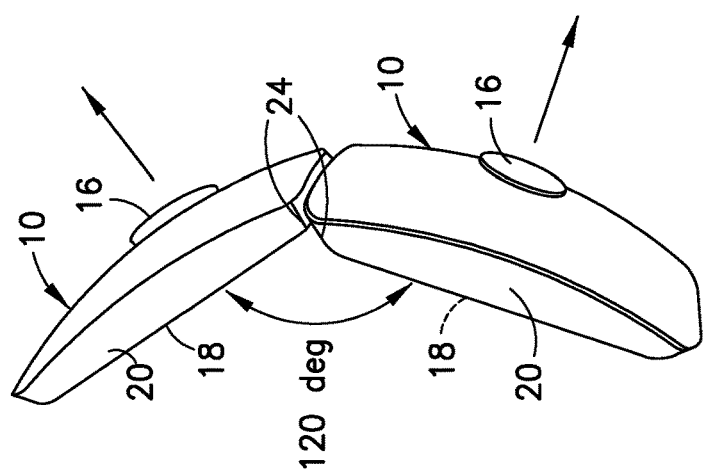

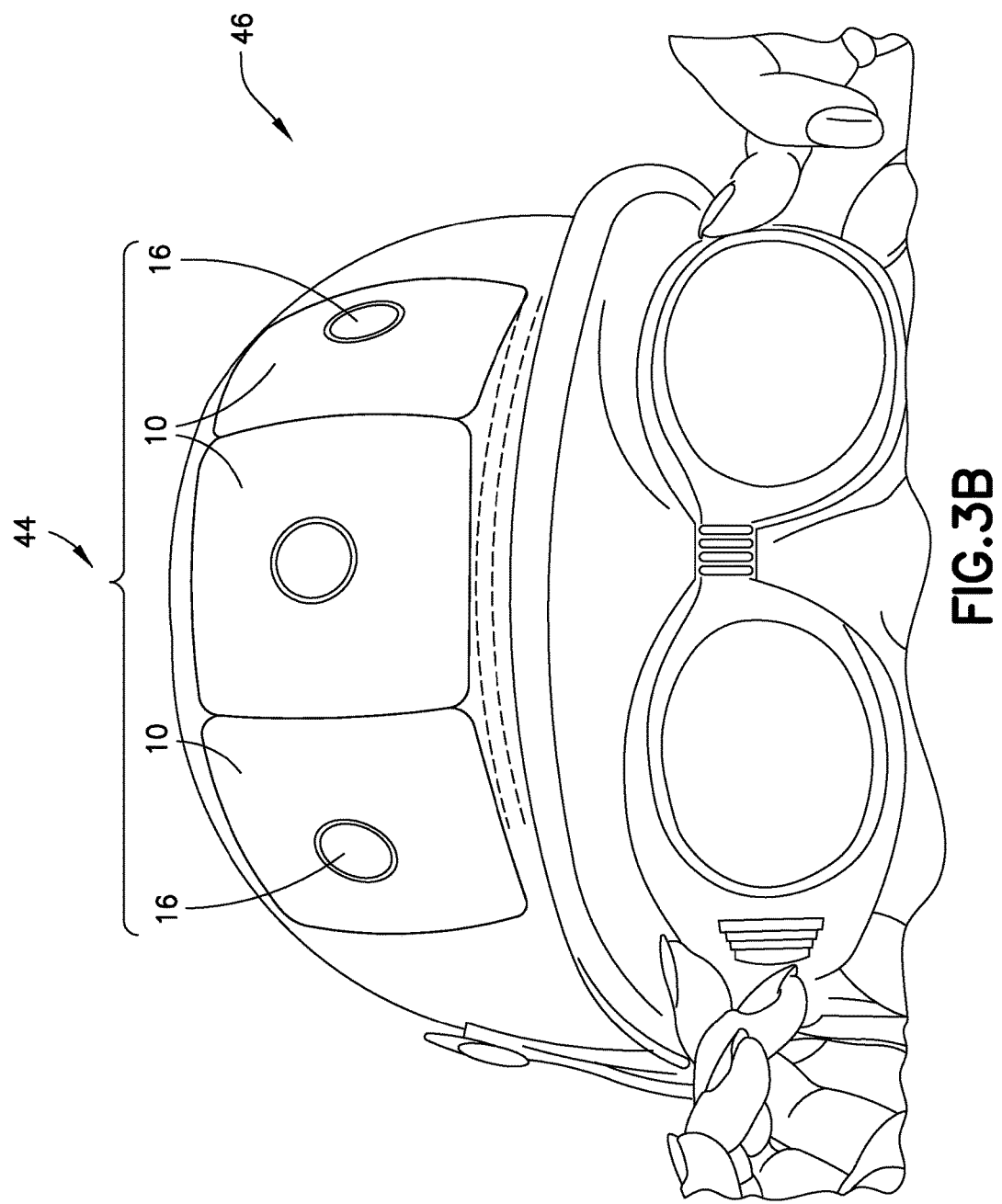

MODULAR CAMERA BLOCKS FOR VIRTUAL REALITY CAPTURE

BACKGROUND

Technical Field

The exemplary and non-limiting embodiments described herein relate generally to cameras and, more particularly, to cameras that can be arranged with any number of other cameras in modular configurations to capture images as three-dimensional and/or 360 degree content for use in virtual reality applications.

Brief Description of Prior Developments

Virtual reality systems use cameras to capture images from various fields of view. These systems generally use dedicated structures in which fixed numbers of cameras are arranged in pre-defined configurations to capture the images. Once captured, the images may be displayed as three-dimensional and/or 360 degree content.

SUMMARY

The following summary is merely intended to be exemplary. The summary is not intended to limit the scope of the claims.

In accordance with one exemplary aspect, an apparatus comprises: a camera module for obtaining a first image, the camera module having at least one port, each of the at least one ports being associated with an attachment position for receiving a second camera module for obtaining a second image; a processor for detecting a position of a second camera module and providing, to an image processing controller, information relating to at least one of the position of the second camera module and the first image obtained by the camera module; and a memory for storing the information relating to at least one of the position of the second camera module and the first image obtained by the camera module.

In accordance with another exemplary aspect, a method comprises obtaining a first image from a camera module having at least one port, each of the at least one ports being associated with an attachment position for receiving a second camera module for obtaining a second image; detecting a position of a second camera module at the at least one port; and providing, to an image processing controller, information relating to at least one of a position of the second camera module and the first image obtained by the camera module.

BRIEF DESCRIPTION OF THE DRAWINGS

The foregoing aspects and other features are explained in the following description, taken in connection with the accompanying drawings, wherein:

FIG. 1A is a front view of a camera for use in the modular configurations of the exemplary embodiments described herein;

FIG. 1B is a side sectional view of the camera of FIG. 1A;

FIGS. 2A through 2C are exemplary configurations of camera arrangements showing resulting fields of view;

FIGS. 3A through 3D are exemplary configurations of multiple camera arrangements;

DETAILED DESCRIPTION OF EMBODIMENT

Figure 3A:
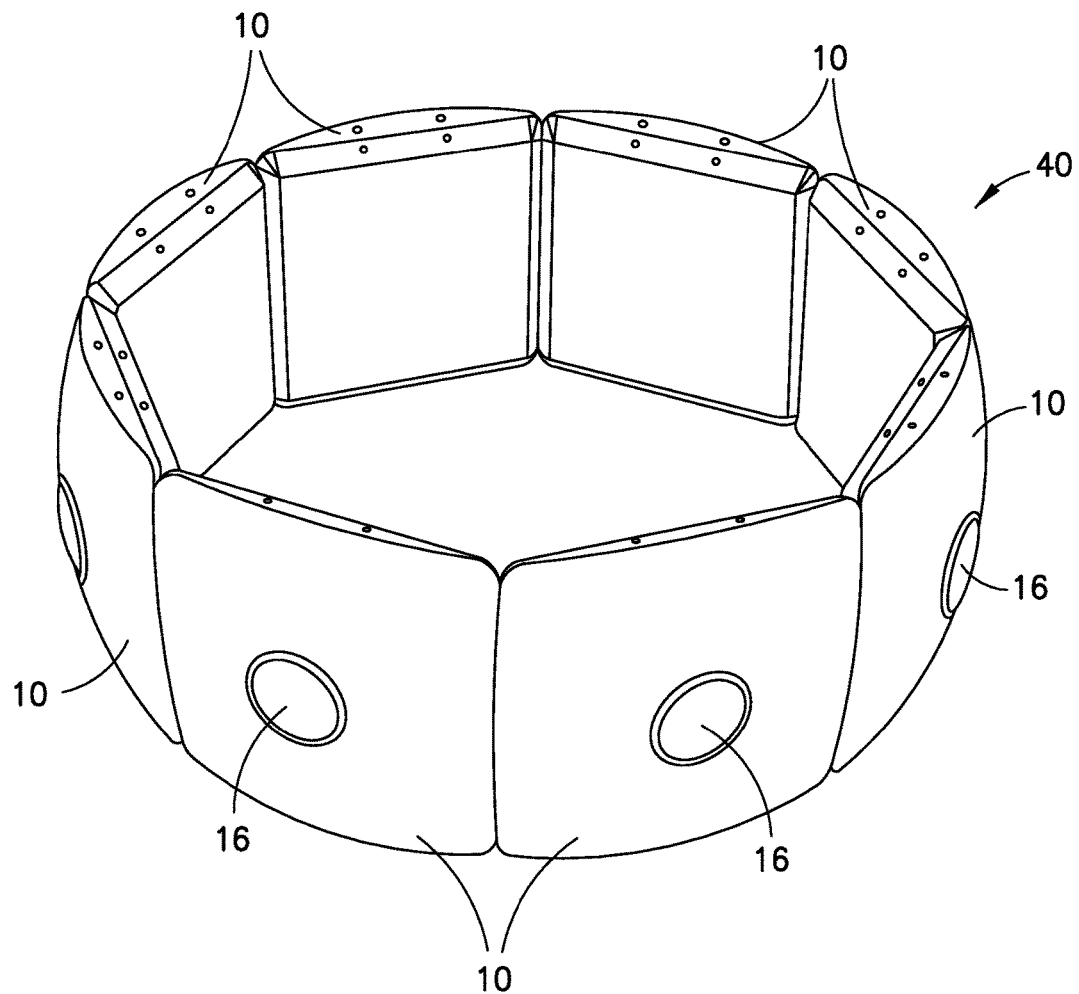

Referring to FIGS. 1A and 1B, one exemplary embodiment of a camera is designated generally by the reference number 10 and is hereinafter referred to as "camera 10." Although the features will be described with reference to the example embodiments shown in the drawings, it should be understood that features can be embodied in many alternate forms of embodiments. In addition, any suitable size, shape, or type of elements or materials could be used.

Camera 10 can be coupled with any number of other cameras to form a logical group or block or modular arrangement of cameras. The cameras 10 may be coupled to each other using a means of communication in any suitable manner to capture images for subsequent display as three-dimensional (3D) and/or 360 degree content. The resulting content can be used to impart a virtual reality (VR) experience to a user. Each configuration (how the cameras 10 are oriented with respect to each other) exhibits a different kind of property in a FoV (Field of View). Regardless of the configuration of the cameras 10, the cameras 10 may autonomously discover each other and their respective camera orientations for image post-processing. Cameras 10 in a configuration may also communicate with each other and share hardware resources if needed. The cameras 10 used in any configuration may be identically shaped, or they may be of different shapes and/or sizes. Furthermore, the cameras 10 in a modular arrangement may have hardware and/or software of different functional capabilities.

One benefit of the modular approach is that the user may select the virtual reality (VR) experience that is the best (adjusting the amount of 3D and views up to 360 degrees) and enrich the VR experience by adding or removing cameras 10 as desired to achieve a particular output. One user may couple his/her camera(s) 10 with those of another user, in some cases. For example, because of the modularity of the arrangement and compatibility of the cameras 10, the camera(s) 10 of one user can be connected together with the camera(s) 10 of another user to provide a cost-effective sharing of resources that enables a desired VR image capture to be achieved.

In addition, instead of capturing 3D or 360 degree images for VR, each camera 10 can be used as a single unit to capture two-dimensional video, still images, or any combination thereof. In being used as a single unit, the camera 10 may be used as an end-user device (e.g., a tablet or smart phone with relevant accessories). When used as an end-user device, application software may be needed to implement the features of the device (e.g., various types of image capture, image and video processing, device discovery, and the like).

Camera 10 comprises a body 12 having a substantially cuboid structure with a convex front surface 14 on which at least one lens 16 is mounted, a substantially flat back surface 18, and a plurality of edges 20. The lens 16 may be any type of lens, for example, a wide angle lens or a fisheye lens. In some cases, the lens 16 may be configured to capture up to and including a 180 degree field of view. As shown, the front surface 14 is substantially square in shape with the lens 16 being mounted substantially in the center thereof. In one exemplary embodiment, each of four edges 20 comprises a first angled surface 24 and a second angled surface 26. The edges 20 and the back surface 18 may each include one or more connection ports in the form of nubs 30 that operate as physical connection ports, power delivery ports, and/or data transfer ports between cameras 10. Located inside or on the body 12 is hardware 32 such as a controller connected to the nubs 30, at least one processor or microprocessor on the controller, local memory for storage content, at least one battery, and a connector or power pickup for charging or data transfer. A wireless connectivity chip may also be present.

Referring to FIGS. 2A through 2C, the first angled surface 24 and the second angled surface 26 of each of the edges 20 allow two or more cameras 10 to be coupled to each other via the nubs 30 in various ways to provide for mutual autonomous discovery and orientation of output images for image processing (e.g., video post-processing) as well as camera-to-camera communication and possibly the sharing of hardware resources.

As shown in FIG. 2A, the first angled surface 24 of one camera 10 may be coupled to the first angled surface 24 of a second camera 10. As shown, the first angled surfaces 24 may be each 30 degrees relative to the back surface 18. In coupling the first angled surface 24 of one camera 10 to another first angled surface 24 of another camera 10, the back surfaces 18 of the cameras 10 are angled at 120 degrees, and a FoV of 240 degrees is obtained through the lenses 16. Coupling the (30 degree) first angled surfaces 24 enables cameras 10 to be assembled into a curved shape.

As shown in FIG. 2B, the second angled surface 26 of one camera 10 may be coupled to the second angled surface 26 of the second camera 10. The second angled surfaces 26 may be each 45 degrees relative to the back surface 18. In coupling the second angled surface 26 of one camera 10 to another second angled surface 26 of another camera 10, the back surfaces 18 of the cameras 10 are angled at 90 degrees, and a horizontal FoV of 270 degrees is obtained through the lenses 16. Coupling the (45 degree) second angled surfaces 26 enables cameras 10 to be assembled into a cuboid or rectangular or box-like shape.

As shown in FIG. 2C, the substantially flat back surface 18 of one camera 10 may be coupled to the substantially flat back surface 18 of the second camera 10. Thus, with the back surfaces 18 of the cameras 10 being positioned against one another, a horizontal FoV of 360 degrees is obtained through the lenses 16. Coupling the substantially flat back surfaces 18 of two cameras 10 in a back-to-back configuration allows for a 360 degree FoV.

Adding additional cameras 10 to any of the foregoing configurations provides additional horizontal and/or vertical FoV. Use of two or more cameras 10 may allow for the overlapping of camera FoV, which allows for the capture of images for display in 3D. Thus, a configuration of cameras 10 is scalable in that any number of cameras 10 can be combined to produce any desired level of VR experience. Although the edges 24 and 26 are discussed above with respect to specific angles, other angles may be implemented to enable modular cameras 10 to be used in image capture.

Referring now to FIGS. 3A through 3D, exemplary configurations of multiple cameras 10 are shown. As shown in FIG. 3A, eight cameras 10 may be arranged in a "ring" configuration 40 to capture images for display in a 360 degree FoV or up to a 360 degree FoV. Cameras 10 in the ring configuration 40 may be oriented such that the ring is horizontal, or they may be oriented such that the ring is vertical or angled. As shown in FIG. 3B, a plurality of cameras 10 may be arranged in a partial ring configuration 44 and worn by a user (e.g., on a hat or helmet 46) or otherwise mounted to capture images for display in 3D.

Figure 3C:
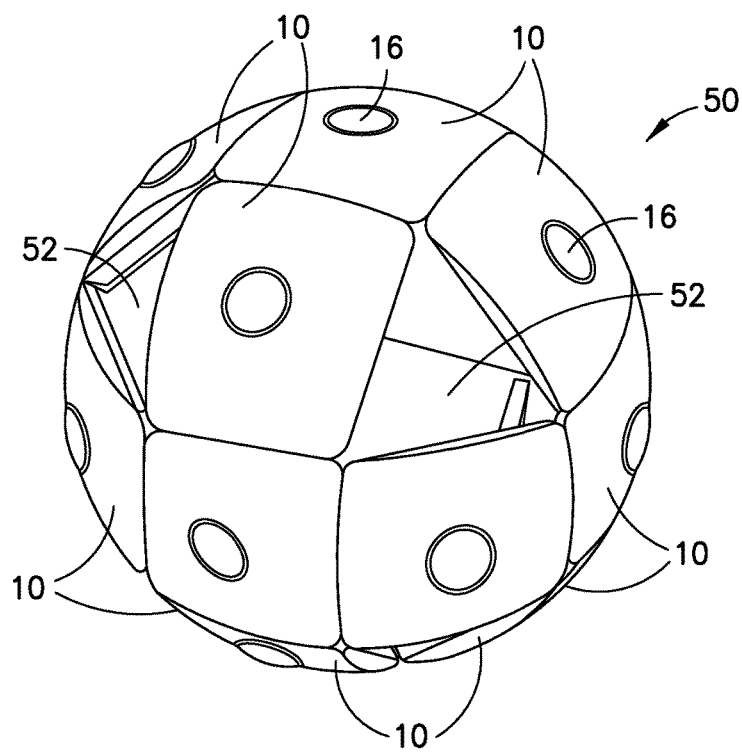

As shown in FIG. 3C, eighteen cameras 10 may be arranged in a spherical configuration 50 to capture images in a 360 degree vertical view as well as in a 360 degree horizontal view. In the spherical configuration 50, portions 52 of the sphere not covered by a camera 10 may be open to allow air to flow in and out of the sphere, thereby providing a cooling effect to avoid a buildup of heat within the spherical configuration 50. Any portion 52 of the sphere having an opening may include a bracket or other device that allows the spherical configuration 50 to be suspended or mounted, e.g., on a post or arm.

Figure 3D:
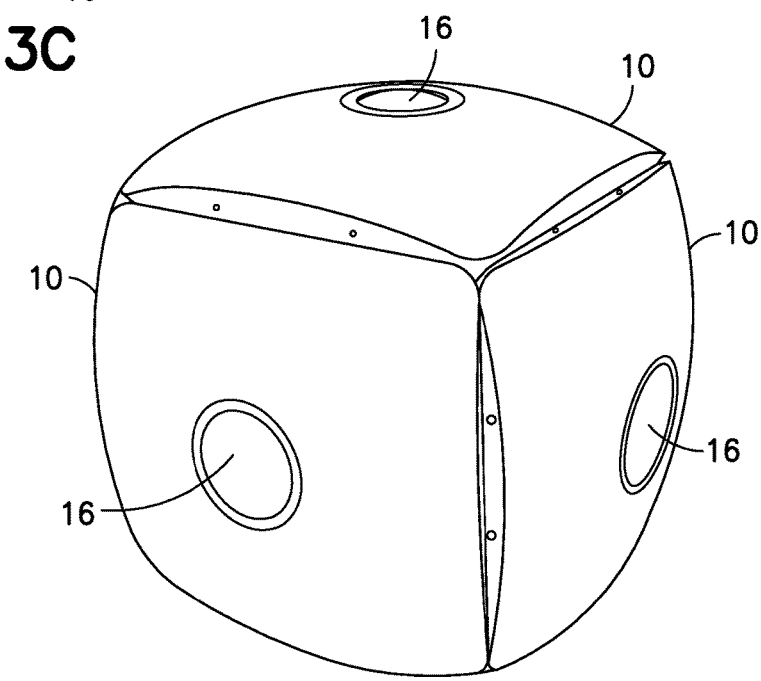

As shown in FIG. 3D, six cameras 10 may be arranged in a prism configuration such as a cube configuration 60. As with the spherical configuration 50, the cube configuration 60 allows for the capture of images in a 360 degree vertical view as well as in a 360 degree horizontal view.

In any of the configurations shown in FIGS. 3A through 3D, the cameras 10 are arranged without any supporting external structure. Also, one or more cameras 10 may be removed from the configuration (ring configuration 40, partial ring configuration 44, spherical configuration 50, or cube configuration 60) to produce an effect on the level of VR experience. For example, by removing a camera 10 from any configuration, less 3D or up to 360 degree effect can be experienced by the user. In doing so, however, the functionalities of the remaining cameras 10 remain the same.

Figure 4A:
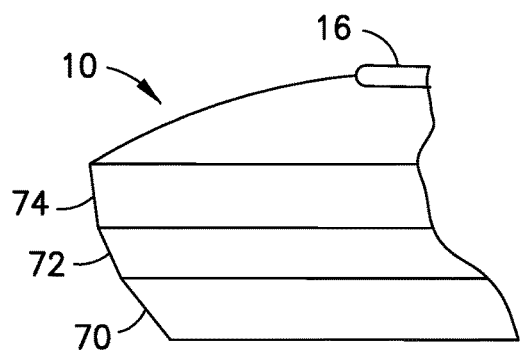
FIG. 4A is an exemplary embodiment of a camera having an edge having multiple angled surfaces.
Figure 4B:
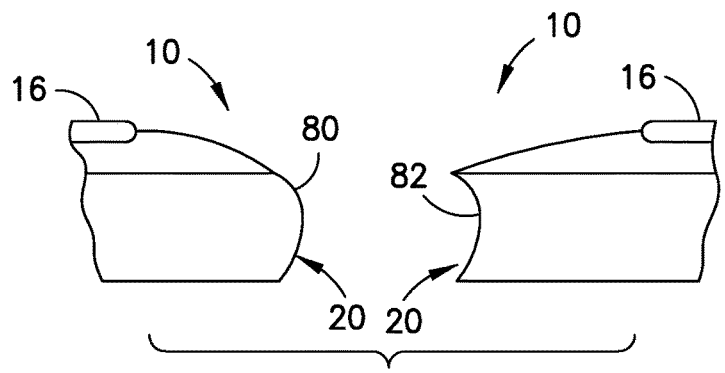
FIG. 4B is an exemplary embodiment of two cameras connected using rounded surfaces on each camera.

Referring now to FIGS. 4A and 4B, other exemplary embodiments of the camera 10 are shown. In FIG. 4A, the camera 10 may comprise edges 20 that have multiple surfaces each having a fixed angle 70, 72, 74, e.g., three or more angles of various degrees, to provide the user more freedom for arranging two or more cameras 10 in a desired configuration. As shown, the first angled surface 70 may be 30 degrees, the second angled surface 72 may be 45 degrees, and the third angled surface 74 may be 60 degrees.

In FIG. 4B, the camera 10 may comprise edges 20 having rounded or curved surfaces 80 that are connectable to corresponding rounded or curved surfaces 82 on an adjacently-positioned camera 10. Using rounded or curved surfaces 80, 82 on the edges 20 allows for a stepless or continuous angle to be maintained between adjacent cameras 10. In such embodiments of the camera 10, an arrangement of cameras 10 is not limited by the angled edges (30 degrees or 45 degrees) as indicated above.

Particularly with regard to cameras 10 having edges with rounded or curved surfaces 80, 82, angles between the cameras 10 are computed, and the resulting data is processed to produce the desired image. In embodiments of cameras 10 utilizing angled surfaces on the edges 20, the attaching of two angled surfaces may be detected mechanically (e.g., by sensors under the connected surfaces of the edges 20) or visually (e.g., by the cameras 10 taking pictures simultaneously (one from each camera 10) and triangulating the relative angle using objects in the picture). In visual detection of the angle between cameras 10, the pictures taken generally require overlapping.

Figure 5A:
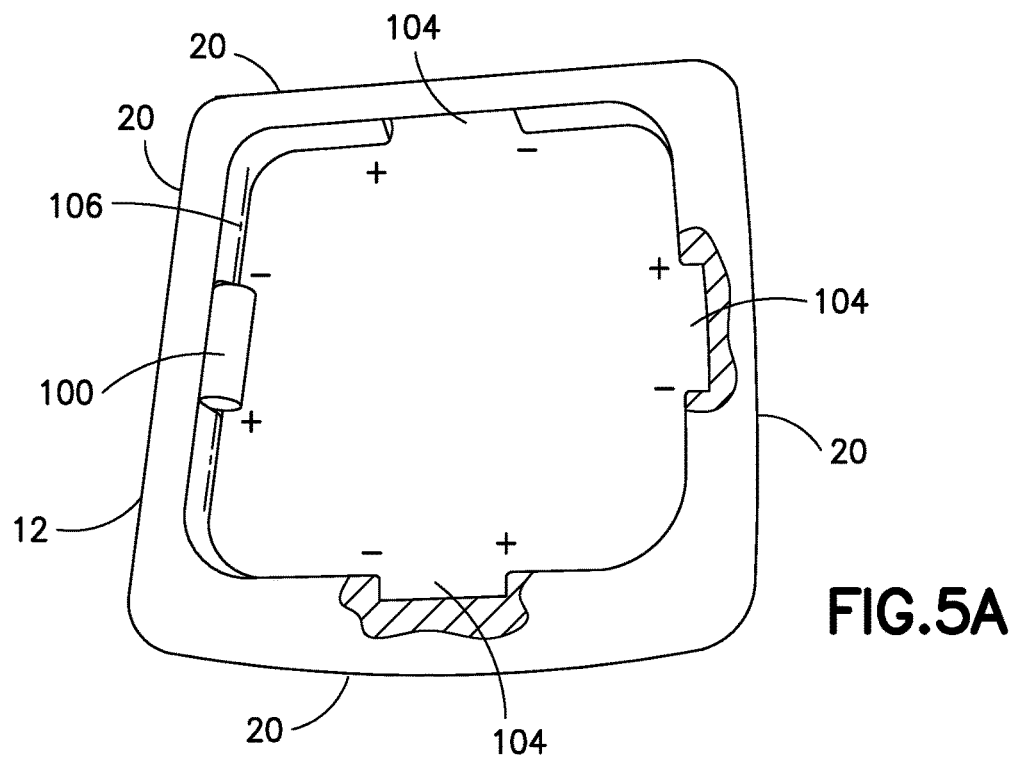
FIGS. 5A through 5C are exemplary configurations of magnets on cameras and devices usable as cameras.

Referring now to FIG. 5A, connection of the edges 20 of any embodiment of the camera 10 may be achieved using any type of latching mechanism, and may include magnets 100 at the nubs 30 for example. Exemplary magnets 100 that may be used include, but are not limited to, neodymium magnets 100. Neodymium is a relatively cheap material and exhibits a much stronger magnetic field than ferromagnetic material. Magnets 100 may be located along each edge 20 of the body 12 to allow a camera 10 to interlock with another camera 10. As shown, the magnets 100 may be located in corresponding pockets 104 on or in the body 12. More specifically, the magnets 100 may be installed into the body 12 and under the outer surface of the body 12 such that the locations of the magnets 100 are visually or tactilely discernible by a user of the camera 10. As shown, the magnets 100 may be located on the body 12 such that a longitudinal axis 106 of each magnet 100 is parallel to the edge 20 and polarities of each magnet 100 around the body 12 alternate. The magnets 100 may be cylindrical in shape, as shown, or they may be substantially flat, disc-shaped, or prism-shaped.

Figure 5C:
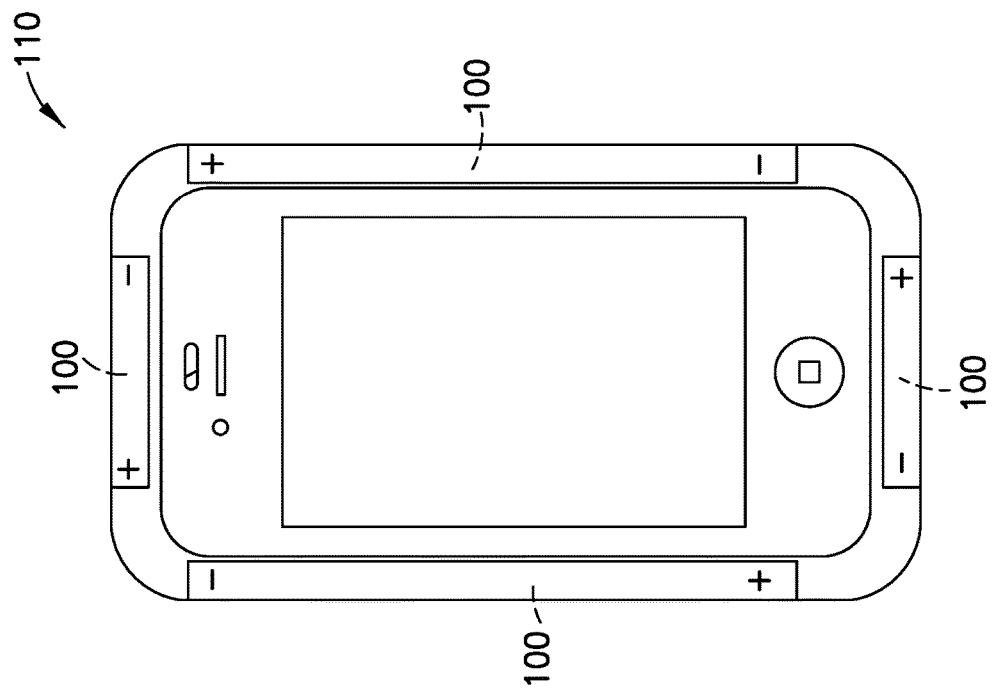
Figure 5B:
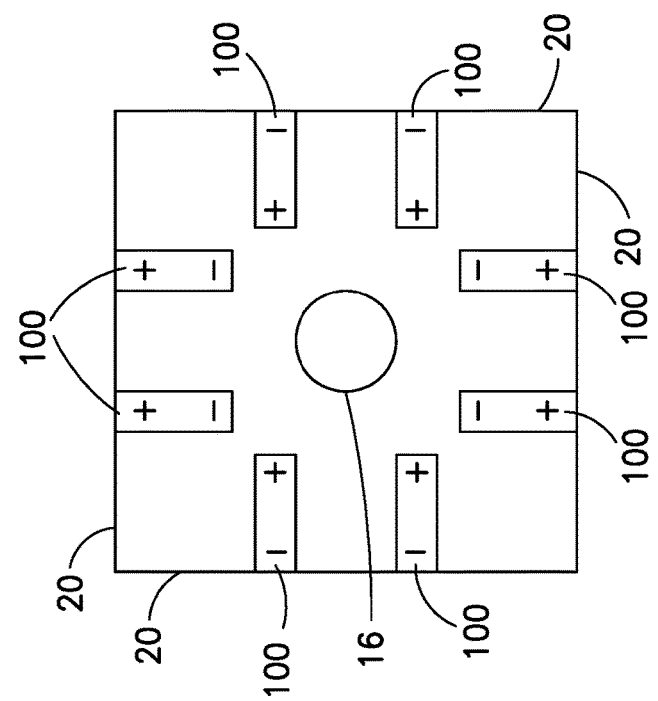

Referring now to FIG. 5B, a plurality of magnets 100 may be located on each edge 20 of the body 12 (e.g., two magnets 100 on each edge 20, as shown). The magnets 100 in such a configuration may be exposed on the surface of the body 12, or they may be under the surface of the body 12. In such an embodiment, the magnets 100 may be installed perpendicularly to each edge 20, thereby providing stronger attachment between cameras 10.

Referring now to FIG. 5C, magnets 100 may be located in a case, protector, or "bumper" accessory for use in coupling smart phones 110, tablets, or other electronic devices to be used as cameras in an array of cameras. Such cases, protectors, or bumper accessories may be silicone, polymer, rubber, cardboard, or the like. As shown, the magnets 100 in the smart phone 110 may be substantially flat and elongated and positioned along the edges 20, or they may be disc-shaped or prism-shaped.

Figure 6A:
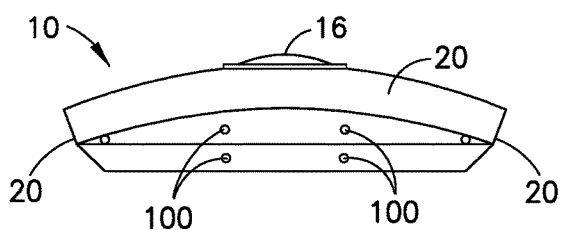
FIGS. 6A through 6D are exemplary embodiments of cameras having multiple magnets on each angled surface.
Figure 6B:
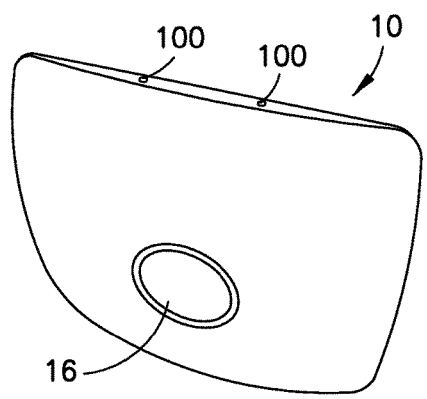
Figure 6C:
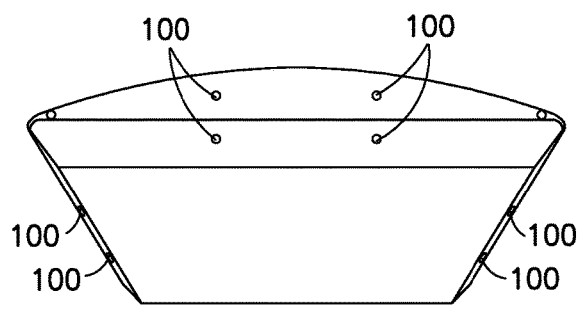
Figure 6D:
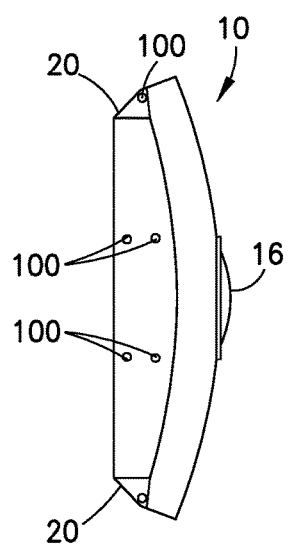

Referring to FIGS. 6A through 6D, exemplary embodiments of a camera 10 having multiple magnets 100 per angled surface defining each edge 20 are shown. As shown in FIGS. 6A through 6C, two magnets 100 may be positioned on each discrete angled surface 24, 26, with each magnet 100 being exposed. As shown in FIG. 6D, a plurality of magnets 100 may also be positioned on the back surface 18 of the camera 10. The magnets 100 may be used also for mounting the camera 10, e.g., to attach the camera 10 to a metallic surface, or with other magnets to attach the camera 10 to clothing, for example, using a backing magnet or backing metallic surface.

Figure 7:
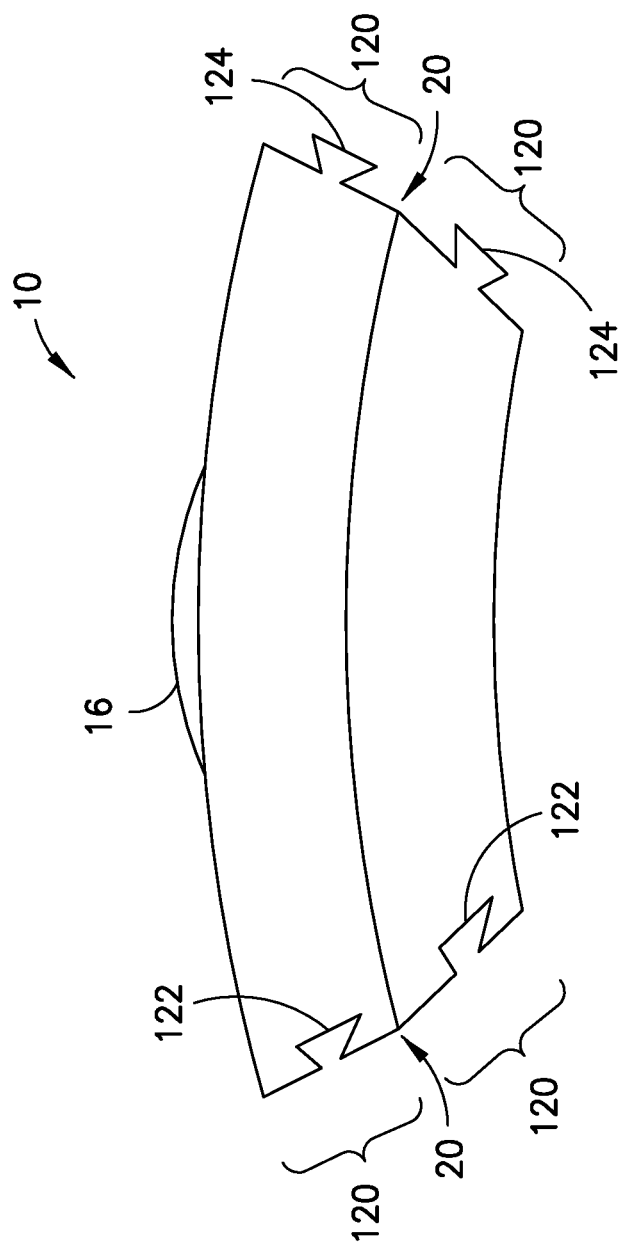
FIG. 7 is a schematic representation of an exemplary embodiment of a camera connectable to another camera using a dovetail joint.

Referring now to FIG. 7, the exemplary embodiments disclosed herein are not limited to the use of magnets 100 for attachment of one camera 10 to another. For cameras 10 used in action scenarios, where the joint between adjacent cameras 10 may require vibration resistance, the magnets 100 may be replaced or supplemented with a dovetail joint 120. In such embodiments, a dovetail receiving portion 122 on one edge 20 may be configured to receive a corresponding dovetail protruding portion 124 on an opposite edge 20. The dovetail receiving portion 122 and the dovetail protruding portion 124 may each be configured to slidingly engage one another. Each angled surface on each edge 20 may have its own dovetail joint 120. Nubs 30 with magnets 100 may still be used in conjunction with the dovetail joint 120.

Figure 8:
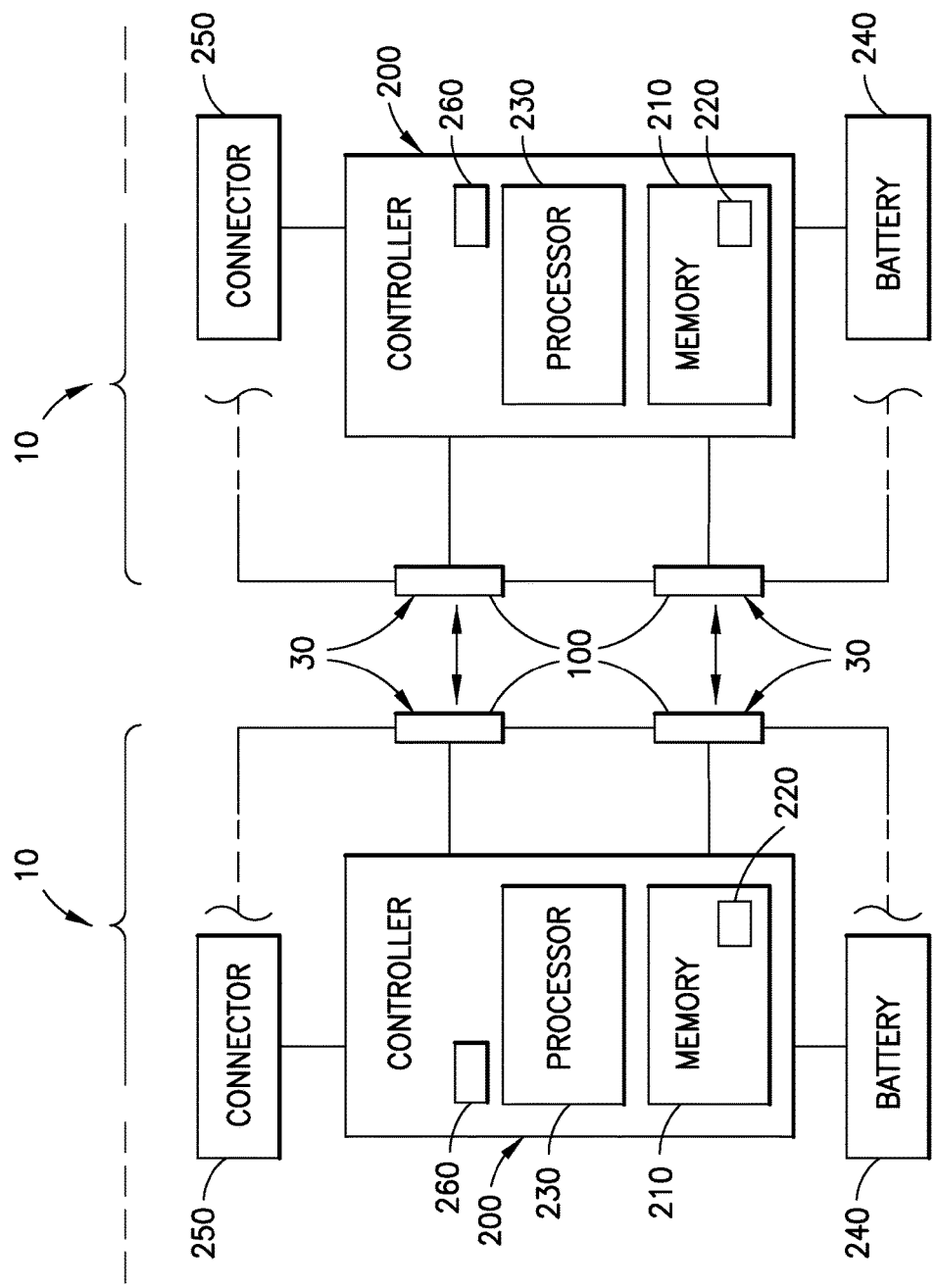
FIG. 8 is a schematic representation of controllers of two cameras connected through magnetic nubs on each camera.

Referring now to FIG. 8, in addition to providing mechanical connection of two or more cameras 10, the magnets 100 may define the nubs 30 as enabling the cameras 10 to share resources (e.g., battery resources) and/or provide communication channels for the exchange of data. The magnet 100 of each nub 30 of a camera 10 may act as a wire connection to a second camera 10 and may be exposed on the body 12 of the camera 10 to provide direct "bare" contact with other nubs 30. Bare contact between each nub 30 may allow each nub 30 to act as a medium for communication. In such a configuration, the magnets 100 may be wired to a controller 200 of each camera 10, which may in turn be wired to the lens 16 of the corresponding camera 10, the controller 200 having a memory 210 and software 220, and a processor 230. A battery 240 may be connected to the controller 200. Connection ports 250 may also be connected to the controller 200 for power pickup, data transfer, and the like. A connectivity chip 260 may also be located on the controller 200.

Figure 9:
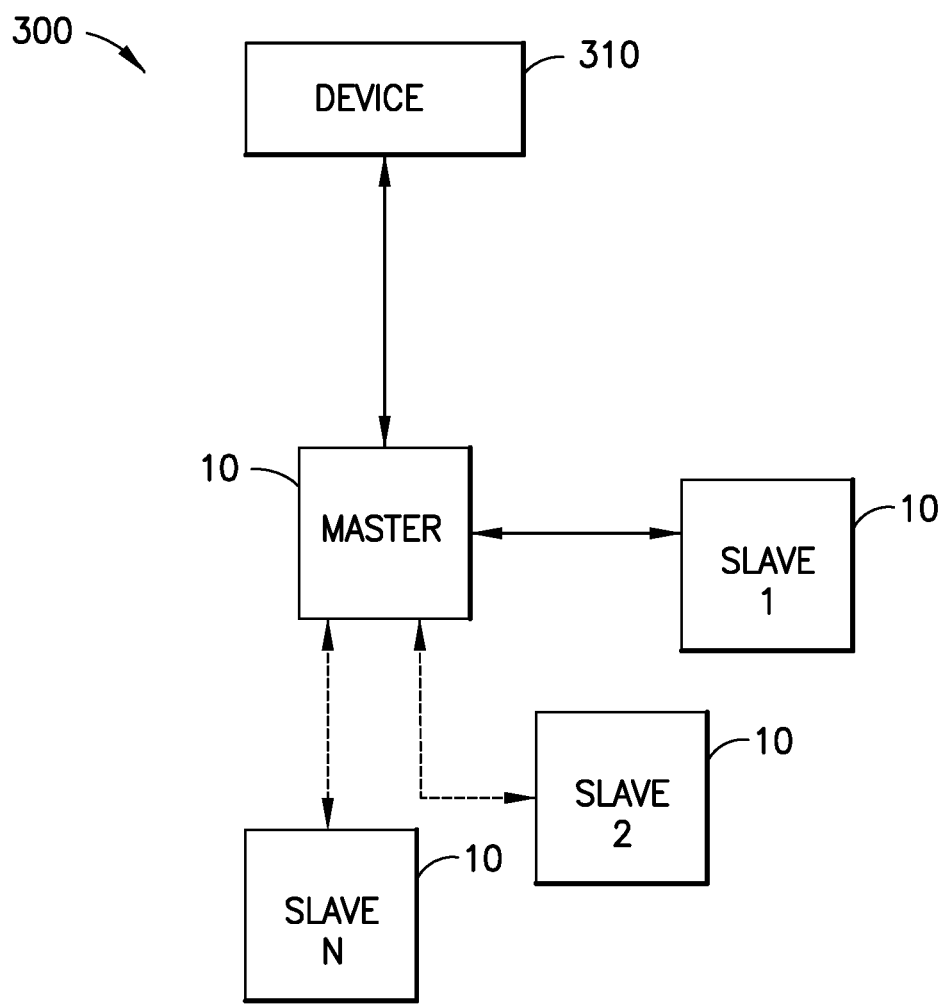
FIG. 9 is a schematic representation of an exemplary system architecture in which slave cameras are connected to a master camera using wired connections.

Referring now to FIG. 9, one exemplary embodiment of a system architecture is designated generally by the reference number 300 and is hereinafter referred to as "system 300." In the system 300, a protocol hierarchy may be built on top of the nub communication via wired connections. Each camera 10 may discover other cameras in proximity by using the physical connection of the magnets 100 to communicate relative camera orientation and/or video parameters. Designated protocols may be used to specify one camera 10 from a plurality of cameras as a "master" with the remaining cameras being specified as "slaves." Any number N of slave cameras 10 may be used in the system 300. Slave cameras 10 may use magnets as communication media or they can use local connectivity to transfer the videos or images from the slave cameras 10 to the master camera 10. The master camera 10 can be selected in various ways, e.g., the camera 10 with the highest battery charge is the master, the camera 10 with the greatest media access control (MAC) address becomes the master, etc. A slave camera may be promoted to the master camera at any time, thereby resulting in the current master camera being demoted to a slave camera. Image processing (e.g., stitching of video from different cameras 10, possibly offline stitching, seam computation algorithms, cross-blending, and the like) may be within either the master camera or the slave camera. In the alternative, captured images can be transferred (by wire or wireless transfer) from the one or more cameras 10 to another device 310 for processing.

Figure 10:
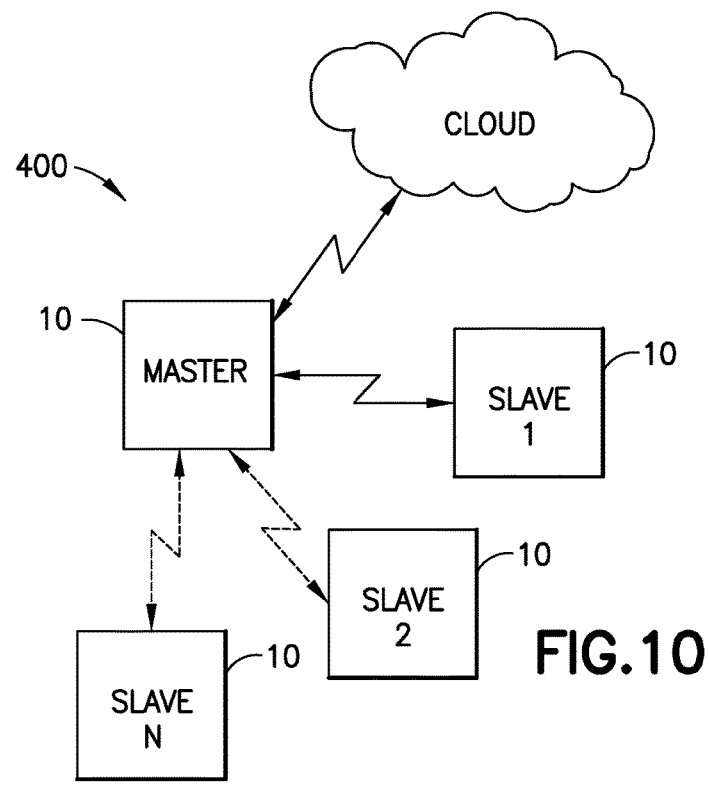
FIG. 10 is a schematic representation of an exemplary system architecture in which communication between master and slave cameras is via wireless communication.

Referring now to FIG. 10, another exemplary embodiment of a system architecture is "system 400," in which communication between cameras 10 and/or to and from cameras 10 is via wireless communication. For example, system 400 may utilize a local radio link like Bluetooth or Wi-Fi for device discovery. In such a system 400, camera orientation and/or other parameters may be shared using a wireless link The cameras 10 may also negotiate when (using time division multiple access (TDMA)) or on which frequency (frequency division multiple access (FDMA)) they are transmitting the video to avoid overlapping in wireless communication transmission. Again, designated protocols may be used to specify one camera 10 from a plurality of cameras as a master with the remaining cameras being specified as slaves with the master camera 10 being selected in various ways (e.g., highest battery charge, greatest MAC address, etc.) Image processing (e.g., stitching, seam computation, cross-blending) may be within either the master camera or the slave camera, or images such as video can be transmitted outside the camera configuration using connectivity chips (e.g., LTE, Wi-Fi, Bluetooth, or the like) or one camera 10 being designated as having responsibility to transmit images or video. The images or video may be transmitted to the Cloud for storage or processing.

Figure 11:
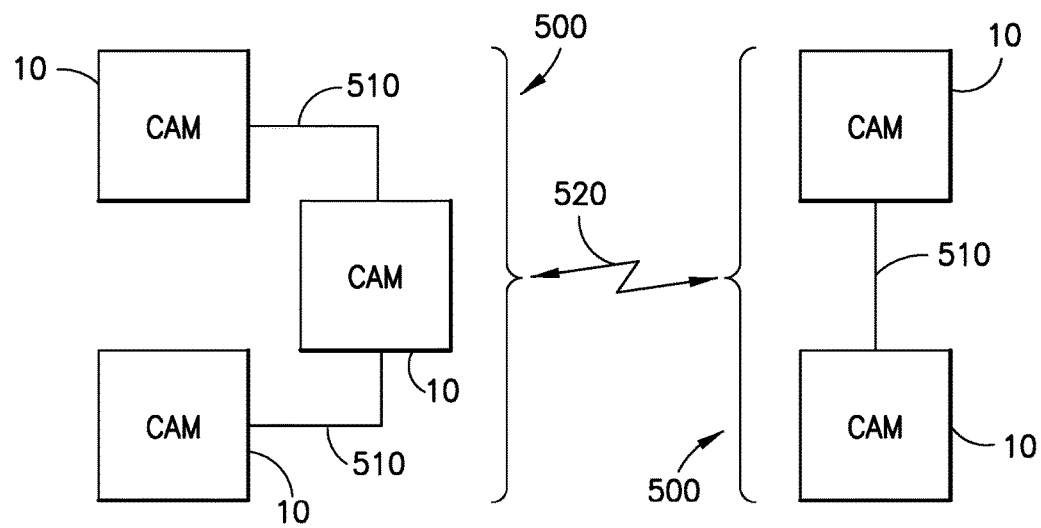
FIG. 11 is a schematic representation of an exemplary system in which a wired cluster of cameras is wirelessly connected to another wired cluster of cameras.

Referring now to FIG. 11, cameras 10 may be arranged in clusters 500 using physical connections 510 (such as magnets 100) with the clusters 500 being connected to other clusters 500 via wireless communication 520.

Figure 12:
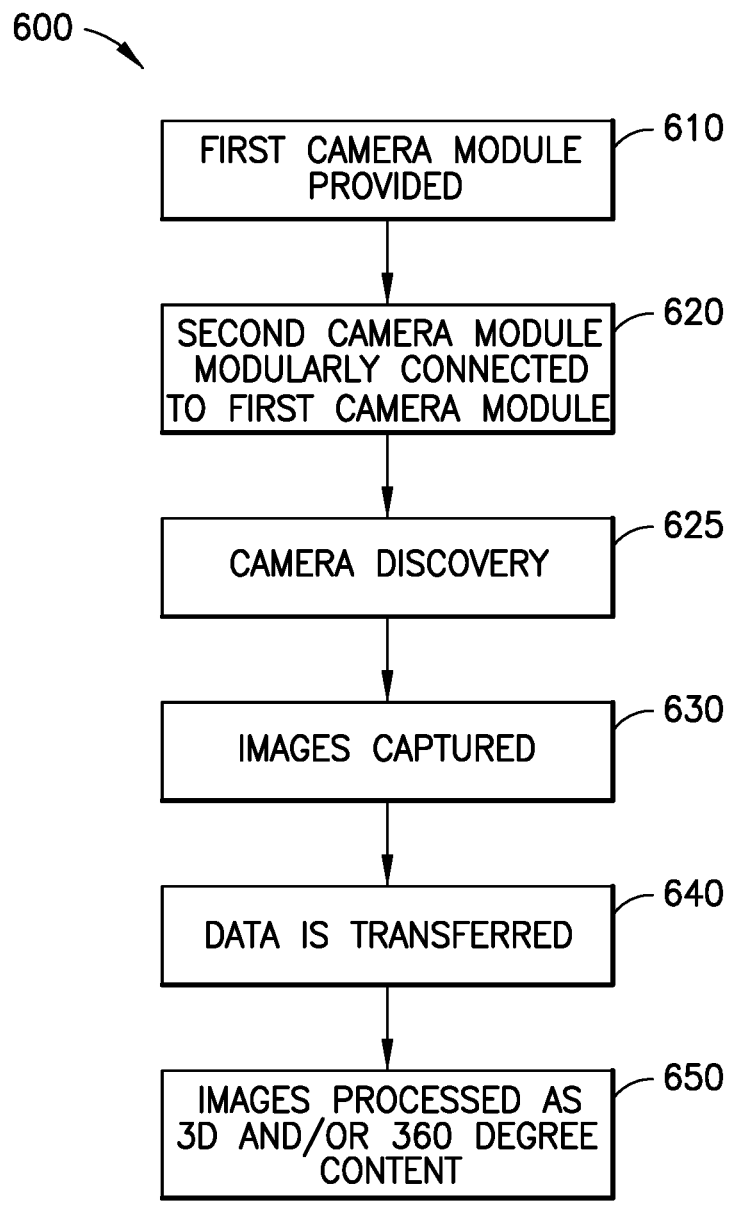
FIG. 12 is a flow diagram of one exemplary embodiment of a method of using modular camera blocks for virtual reality capture.

Referring now to FIG. 12, a method using the modular camera blocks for virtual reality capture is shown generally at 600 and is hereinafter referred to as "method 600." In method 600, a first camera module having a first connection port and a first controller coupled to the first connection port is provided in step 610. In step 620, a second camera module having a second connection port and a second controller coupled to the second connection port is modularly connected to the first camera module. In step 625, camera modules may discover each other. In step 630, images are captured on the first camera module and the second camera module. In step 640, data is transferred between the first camera module and the second camera module. In step 650, the images captured are processed as three-dimensional and/or 360 degree content, possibly for use in a virtual reality application.

Any of the foregoing exemplary embodiments may be implemented in software, hardware, application logic, or a combination of software, hardware, and application logic. The software, application logic, and/or hardware may reside in the camera 10 (or other device) to detect relative positions of connected modular cameras for image capture and processing. If desired, all or part of the software, application logic, and/or hardware may reside at any other suitable location. In an example embodiment, the application logic, software, or an instruction set is maintained on any one of various computer-readable media. A "computer-readable medium" may be any media or means that can contain, store, communicate, propagate, or transport instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

In one exemplary embodiment, an apparatus comprises: a camera module for obtaining a first image, the camera module having at least one port, each of the at least one ports being associated with an attachment position for receiving a second camera module for obtaining a second image; a processor for detecting a position of a second camera module and providing, to an image processing controller, information relating to at least one of the position of the second camera module and the first image obtained by the camera module; and a memory for storing the information relating to at least one of the position of the second camera module and the first image obtained by the camera module.

In the apparatus, the at least one port associated with an attachment position for receiving a second camera module may be configured to provide one or more of data transfer and resource sharing with the second camera module. The first image obtained by the camera module and the second image obtained by the second camera module may be configured to be processed by the image processing controller to display one or more of three-dimensional content and up to 360 degree content. The camera module may be configured to be selectively connectable to the second camera module at an angle using a surface on the camera module to allow for a combined field of view that is at least as wide as a field of view from the camera module and a field of view from the second camera module individually. The apparatus may further comprise at least one third camera module such that the third camera module is selectively connectable with the camera module and the second camera module in a ring configuration, a partial ring configuration, a spherical configuration, or a prism configuration. The camera module may be attachable to the second camera module using a magnetic means. The camera module may comprise a mobile device or a tablet. The camera module may use a designated protocol to specify itself as a master camera module relative to the second camera module.

In another exemplary embodiment, a method comprises obtaining a first image from a camera module having at least one port, each of the at least one ports being associated with an attachment position for receiving a second camera module for obtaining a second image; detecting a position of a second camera module at the at least one port; and providing, to an image processing controller, information relating to at least one of a position of the second camera module and the first image obtained by the camera module.

The method may further comprise providing one or more of data transfer and resource sharing through the at least one port to the second camera module. The first image obtained by the camera module and the second image obtained by the second camera module may be processed by the image processing controller to display one or more of three-dimensional content and up to 360 degree content. The camera module may be connected to the second camera module at an angle using an angled surface on the camera module to allow for a combined field of view that is at least as wide as a field of view from the camera module and a field of view from the second camera module individually. The method may further comprise obtaining a third image from a third camera module connected with the camera module and the second camera module in a ring configuration, a partial ring configuration, a spherical configuration, or a prism configuration. The camera module may be magnetically attachable to the second camera module. The method may further comprise the camera module using a designated protocol to specify itself as a master camera module relative to the second camera module.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. An apparatus, comprising:
    a first camera module for obtaining a first image, the camera module having a substantially flat back surface and a plurality of edges, each of said edges having a respective first angled surface and a respective second angled surface, each of said respective first and second angled surfaces having at least one respective connection port thereon, each of the respective connection ports being associated with an attachment position for receiving a second camera module;
    a processor for detecting a relative position of the first and second camera modules and providing, to an image processing controller, information relating to at least one of the relative position and the first image, the relative position being detected based on which of the respective connection ports is connected to the second camera module; and a memory for storing the information relating to at least one of the relative position and the first image;

wherein each of the respective first angled surfaces is oriented at a first angle with respect to the substantially flat back surface; and wherein each of the respective second angled surfaces is oriented at a second angle with respect to the substantially flat back surface, the second angle being different from the first angle.

2. The apparatus of claim 1, wherein the at least one respective connection port is configured to provide one or more of data transfer and resource sharing with the second camera module.

3. The apparatus of claim 1, wherein the first image obtained by the first camera module is configured to be processed by the image processing controller together with a second image obtained by the second camera module to enable generation of one or more of three-dimensional content and up to 360 degree content.

4. The apparatus of claim 1, wherein the first camera module is configured to be connectable to the second camera module at a selected one of the first and second angles using a selected one of the edges to allow for a combined field of view that is at least as wide as a field of view from the first camera module and a field of view from the second camera module individually.

5. The apparatus of claim 1, further comprising an array of camera modules that includes the first and second camera modules and at least one third camera module arranged in a ring configuration, a partial ring configuration, a spherical configuration, or a prism configuration.

6. The apparatus of claim 1, wherein the first camera module comprises one or more magnets attachable to corresponding one or more magnets of the second camera module.

7. The apparatus of claim 1, wherein the first camera module comprises a mobile device or a tablet.

8. The apparatus of claim 1, wherein the first camera module is configured to use a designated protocol to specify itself as a master camera module relative to the second camera module.

9. A method, comprising:
obtaining a first image from a first camera module having a substantially flat back surface and a plurality of edges, each of said edges having a respective first angled surface and a respective second angled surface, each of said respective first and second angled surfaces having at least one respective connection port thereon, each of the respective connection ports being associated with an attachment position for receiving a second camera module;

detecting a relative position of the first and second camera modules, the relative position being detected based on which of the respective connection ports is connected to the second camera module; and providing, to an image processing controller, information relating to at least one of the relative position and the first image;

wherein each of the respective first angled surfaces is oriented at a first angle with respect to the substantially flat back surface; and wherein each of the respective second angled surfaces is oriented at a second angle with respect to the substantially flat back surface, the second angle being different from the first angle.

10. The method of claim 9, further comprising providing one or more of data transfer and resource sharing through the at least one respective connection port to the second camera module.

11. The method of claim 9, wherein the first image obtained by the first camera module and a second image obtained by the second camera module are processed by the image processing controller to display one or more of three-dimensional content and up to 360 degree content.

12. The method of claim 9, further comprising connecting the first camera module to the second camera module at a selected one of the first and second angles using a selected one of the edges to allow for a combined field of view that is at least as wide as a field of view from the first camera module and a field of view from the second camera module individually.

13. The method of claim 9, further comprising obtaining a third image from a third camera module connected with the first camera module and the second camera module in a ring configuration, a partial ring configuration, a spherical configuration, or a prism configuration.

14. The method of claim 9, wherein the first camera module is magnetically attachable to the second camera module.

15. The method of claim 9, further comprising using a designated protocol to specify the first camera module as a master camera module relative to the second camera module.

16. A non-transitory machine-readable medium, having encoded thereon program code, wherein, when the program code is executed by a machine, the machine implements a method comprising:
obtaining a first image from a first camera module having a substantially flat back surface and a plurality of edges, each of said edges having a respective first angled surface and a respective second angled surface, each of said respective first and second angled surfaces having at least one respective connection port thereon, each of the respective connection ports being associated with an attachment position for receiving a second camera module, wherein each of the respective first angled surfaces is oriented at a first angle with respect to the substantially flat back surface; and wherein each of the respective second angled surfaces is oriented at a second angle with respect to the substantially flat back surface, the second angle being different from the first angle;

detecting a relative position of the first and second camera modules, the relative position being detected based on which of the respective connection ports is connected to the second camera module; and providing, to an image processing controller, information relating to at least one of the relative position and the first image.

17. The non-transitory machine-readable medium of claim 16, wherein the method further comprises providing one or more of data transfer and resource sharing through the at least one respective connection port to the second camera module.

18. The non-transitory machine-readable medium of claim 16, wherein the method further comprises obtaining a third image from a third camera module connected with the first camera module and the second camera module in a ring configuration, a partial ring configuration, a spherical configuration, or a prism configuration.

19. The apparatus of claim 1, wherein a difference between the first and second angles is at least 15 degrees.

20. The apparatus of claim 1, wherein neither of the first and second angles is 90 degrees.

* * * * *